(12) United States Patent
Freydina et al.

(10) Patent No.: US 10,590,514 B2
(45) Date of Patent: Mar. 17, 2020

(54) NANOSTRUCTURED ALUMINUM ZIRCONIUM ALLOYS FOR IMPROVED ANODIZATION

(71) Applicant: Xtalic Corporation, Marlborough, MA (US)

(72) Inventors: Evgeniya Freydina, Acton, MA (US); Joshua Garth Abbott, Westborough, MA (US); Alan C. Lund, Ashland, MA (US); Robert Daniel Hilty, Walpole, MA (US); Shiyun Ruan, Arlington, MA (US); Jason Reese, Londonderry, NH (US); Lisa J. Chan, Boston, MA (US); James A. Wright, Los Gatos, CA (US); James A. Curran, Morgan Hill, CA (US)

(73) Assignee: XTALIC CORPORATION, Marlborough, MA (US)

(*) Notice: Subject to any disclaimer, the term of this patent is extended or adjusted under 35 U.S.C. 154(b) by 244 days.

(21) Appl. No.: 15/482,675

(22) Filed: Apr. 7, 2017

(65) Prior Publication Data

US 2018/0002786 A1 Jan. 4, 2018

Related U.S. Application Data

(60) Provisional application No. 62/357,700, filed on Jul. 1, 2016.

(51) Int. Cl.
*C22C 21/00* (2006.01)
*C25D 11/04* (2006.01)
(Continued)

(52) U.S. Cl.
CPC .............. *C22C 21/00* (2013.01); *B32B 15/01* (2013.01); *C25D 3/665* (2013.01); *C25D 5/18* (2013.01); *C25D 5/48* (2013.01); *C25D 11/04* (2013.01)

(58) Field of Classification Search
CPC . C25D 11/04; C25D 5/18; C25D 5/48; C25D 7/00; C25D 11/246; C25D 1/00;
(Continued)

(56) References Cited

U.S. PATENT DOCUMENTS

| 4,875,983 A | 10/1989 | Alota et al. |
| 7,608,301 B2 | 10/2009 | Bacos et al. |

(Continued)

FOREIGN PATENT DOCUMENTS

WO 2008/157612 A1 12/2008

OTHER PUBLICATIONS

Tsuda et al., "Electrodeposition of Al—Zr Alloys from Lewis Acidic Aluminum Chloride-1-Ethyl-3-methylimidazolium Chloride Melt", Journal of the Electrochemical Society, 151 (7) C447-C454, May 19, 2004.

(Continued)

*Primary Examiner* — Yan Lan
(74) *Attorney, Agent, or Firm* — Dorsey & Whitney LLP (57) ABSTRACT

Techniques for forming an enclosure comprised of aluminum zirconium alloy layer are disclosed. In some embodiments, aluminum ions and zirconium ions can be dissolved in a non-aqueous ionic liquid in an electrolytic plating bath. A reverse pulsed electric current can facilitate in co-depositing the aluminum ions and the zirconium ions onto a metal substrate. The resulting aluminum zirconium alloy layer can include nanocrystalline grain structures, which can impart the alloy layer with increased hardness and increased resistance to scratching, denting, and abrasion. In some embodi- (Continued)

ments, the aluminum zirconium alloy layer can be anodized to form an aluminum oxide layer. Subsequent to the anodization operation, the oxidized layer is able to retain its substantially neutral color.

20 Claims, 9 Drawing Sheets (51) Int. Cl.
*C25D 7/00* (2006.01)
*C25D 5/48* (2006.01)
*H05K 5/04* (2006.01)
*B32B 15/01* (2006.01)
*C25D 5/18* (2006.01)
*C25D 3/66* (2006.01)

(58) Field of Classification Search
CPC .. C25D 3/04; C25D 3/44; C25D 3/665; B32B 15/016; C22C 21/00; G06F 1/16; H04M 1/0283; H05K 5/04
See application file for complete search history.

(56) References Cited

U.S. PATENT DOCUMENTS

| 8,500,986 | B1 | 8/2013 | Schuh et al. |
| 8,815,342 | B2 | 8/2014 | Menuey et al. |
| 8,821,707 | B2 | 9/2014 | Inoue et al. |
| 2006/0290000 | A1 | 12/2006 | Worwag et al. |
| 2010/0285322 | A1 | 11/2010 | Inoue et al. |
| 2014/0272458 | A1 | 9/2014 | Ruan et al. |
| 2015/0322582 | A1* | 11/2015 | Freydina ................. C25D 5/44 428/629 |
| 2017/0067179 | A1 | 3/2017 | Ul-hamid et al. |
| 2018/0087173 | A1* | 3/2018 | Freydina ................. C25D 5/18 |

OTHER PUBLICATIONS

Lou et al., "Electroplating", Encyclopedia of Chemical Processing DOI: 10.1081/E-ECHP-120007747, pp. 1-10, 2006.
Danilov et al., "Electroplating of Wear-Resistant Nanocrystalline Coatings from a Bath Containing Basic Chromium(III) Sulfate (Chrome Tanning Agent)", Protection of Metals and Physical Chemistry of Surfaces, vol. 49, No. 3, Pleiades Publishing Ltd., pp. 299-303, May 23, 2013.
Coffey et al., "Concept Feasibility Report for Electroplating Zirconium onto Uranium Foil", U.S. Department of Energy, PNNL-24106, Mar. 2015, 44 pages.
Wang et al., "Effects of bivalent Co ion on the co-deposition of nickel and nano-diamond particles", Surface & Coating Technology, vol. 191, Mar. 2004, 6 pages.
Archer, "Chrome Plating From Cr(III) in Ionic Liquids—An Industrial Perspective", POETON, IONMET, Feb. 21, 2008, 16 pages.
Bach et al., "Impact of Self Propagating High Temperature Synthesis of Spraying Materials on Coatings based on Aluminium and Metal-Oxides", Thermal Spray 2001: New Surfaces for a New Millenium: Proceedings of the International Thermal Spray Conference, ASM International, May 2001, pp. 497-502.
Endres et al., "Electrodeposition from Ionic Liquids", Wiley-VCH Verlag GmbH & Co. KGaA, Weinheim, 2008, Chapters 3-5 (pp. 47-145) and Chapters 8-10 (pp. 213-283).

* cited by examiner

NANOSTRUCTURED ALUMINUM ZIRCONIUM ALLOYS FOR IMPROVED ANODIZATION

CROSS-REFERENCE TO RELATED APPLICATIONS

The present application claims the benefit of U.S. Provisional Application No. 62/357,700, entitled "NANOSTRUCTURED ALUMINUM ZIRCONIUM ALLOYS FOR IMPROVED ANODIZATION" filed on Jul. 1, 2016, the contents of which are incorporated by reference in its entirety for all purposes.

This application is related to U.S. patent application Ser. No. 15/482,678, entitled "NANOSTRUCTURED ALUMINUM ALLOYS FOR IMPROVED HARDNESS", by Evgeniya Freydina et al., filed Apr. 7, 2017, the contents of which are incorporated by reference herein in their entirety for all purposes.

FIELD OF INVENTION

The described embodiments relate to metal alloys and methods for forming aluminum zirconium alloys. More specifically, aluminum zirconium alloys having nanocrystalline structures for improved hardness and post-anodizing results are described.

BACKGROUND

Metal alloys are a mixture of metals and other materials, such as other trace amounts of metals. Pure aluminum is generally soft and highly ductile material. In particular, aluminum alloys can increase the mechanical strength and improve the scratch and dent resistance of a part. In general, pure aluminum can be anodized to form a relatively translucent and cosmetically appealing aluminum oxide coating. Some aluminum alloys can be anodized to form aluminum oxide coatings with satisfactory appearance—that is, having relatively translucent aluminum oxide coating. However, anodizing some aluminum alloys having a particular alloying element, or alloying elements in higher concentrations, can result in aluminum oxide coatings having a discolored appearance—such as a yellowed appearance. Thus, despite the mechanical advantages of using aluminum alloys compared to pure aluminum, some aluminum alloys cannot be anodized to form an aluminum oxide coating having a satisfactory appearance using conventional techniques.

SUMMARY

This paper describes various embodiments that relate to forming aluminum zirconium alloys. In particular embodiments, the aluminum zirconium alloy is formed onto a substrate as an aluminum zirconium alloy layer. The aluminum zirconium alloys can be characterized as having a nanocrystalline structure that enhances the hardness of the aluminum zirconium alloys. In addition, the aluminum zirconium alloys can be anodized to provide a cosmetically appealing aluminum oxide protective coating.

According to one embodiment, a method of forming a consumer electronic product enclosure including an aluminum zirconium alloy is described. The method involves co-depositing aluminum ions and zirconium ions onto a metal substrate.

According to another embodiment, a consumer electronic product enclosure is described. The consumer electronic product enclosure includes an aluminum zirconium alloy having between about 1 atomic percent to about 12 atomic percent of zirconium.

According to another embodiment, a part of a consumer electronic product is described. The part includes a metal substrate and an aluminum zirconium alloy bonded to the metal substrate. The aluminum zirconium alloy includes nanocrystalline structures having a grain size of less than 1 micrometer.

According to another embodiment, an article is described. The article includes an aluminum zirconium alloy layer having between about 1 atomic percent to about 12 atomic percent of zirconium.

According to another embodiment, an article is described. The article includes a metal substrate, and an aluminum zirconium alloy layer bonded to the metal substrate, wherein the aluminum zirconium alloy layer includes nanocrystalline structures having a grain size of less than 1 micrometer.

Any publications, patents, and patent applications referred to in the instant specification are herein incorporated by reference in their entireties. To the extent that the publications, patents, or patent applications incorporated by reference contradict the disclosure contained in the instant specification, the instant specification is intended to supersede and/or take precedence over any such contradictory material.

The described embodiments may be understood by reference to the following description and the accompanying drawings. Additionally, advantages of the described embodiments may be understood by reference to the following description and accompanying drawings.

BRIEF DESCRIPTION OF THE DRAWINGS

The disclosure will be readily understood by the following detailed description in conjunction with the accompanying drawings, wherein like reference numerals designate like structural elements.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

The following disclosure describes various embodiments of metal alloys and methods for forming metal alloys. Certain details are set forth in the following description and figures to provide a thorough understanding of various embodiments of the present technology. Moreover, various features, structures, and characteristics of the present technology can be combined in other suitable structures and environments. In other instances, well-known structures, materials, operations, or systems are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

This application describes aluminum zirconium alloys and methods for forming aluminum zirconium alloys. In particular embodiments, the aluminum zirconium alloys are composed primarily of aluminum with zirconium added in lesser amounts. Methods described herein detail forming nanocrystalline structures in the aluminum zirconium alloy layer, which is associated with improved hardness and therefore improved resistance to scratches and dents. Furthermore, methods described herein can improve corrosion-resistance by avoiding coarse iron-based constituent particles present in conventionally-melted aluminum alloys.

One technique for forming an aluminum zirconium alloy involves electroplating aluminum ions and zirconium ions onto a metal substrate such that the aluminum ions and zirconium ions are co-deposited onto the metal substrate. In some cases, this technique involves providing the aluminum ions and zirconium ions in a non-aqueous ionic liquid plating bath. Upon applying an electric current to the plating bath, an aluminum zirconium layer is formed as a coating on the metal substrate.

In addition, the aluminum zirconium alloys can be anodized to provide aluminum oxide films having improved cosmetic appearances compared to other types of aluminum alloys. The anodized aluminum zirconium alloys are well suited for providing protective and attractive surfaces for various consumer products. For example, methods described herein can be used for providing protective and cosmetically appealing exterior portions of metal enclosures and casings for electronic devices.

As used herein, the terms anodic film, anodized film, anodic layer, anodized layer, anodic oxidized layer, oxide film, oxidized layer, oxide layer, etc. are used interchangeably and can refer to any suitable oxide layer. The oxide layers are formed on metal surfaces of a metal substrate. The metal substrate can be made of any suitable type of metal. As described herein, the term "alloy" refers to a mixture of a metal and another element that are joined through metallic bonds. As described herein, the term "co-deposition" refers to the metal ions (e.g., aluminum and zirconium) being plated together onto the metal substrate.

Figure 1A:
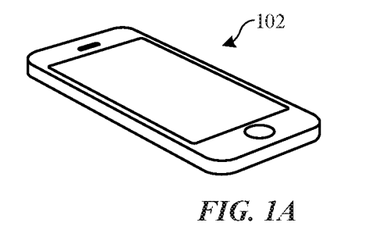
FIGS. 1A-1D illustrate perspective views of various devices having metallic surfaces that can be manufactured using the aluminum zirconium alloys described herein.
Figure 1B:
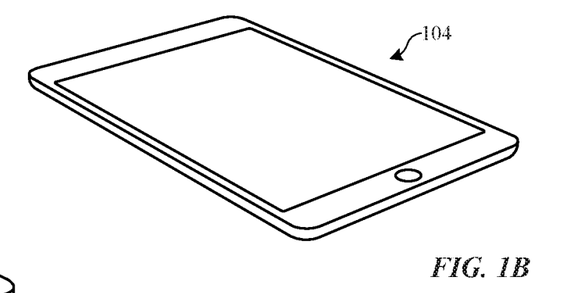
Figure 1C:
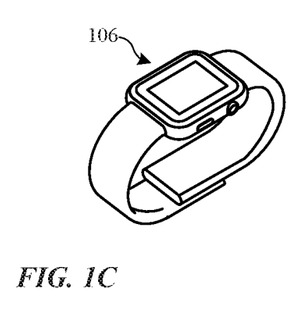
Figure 1D:
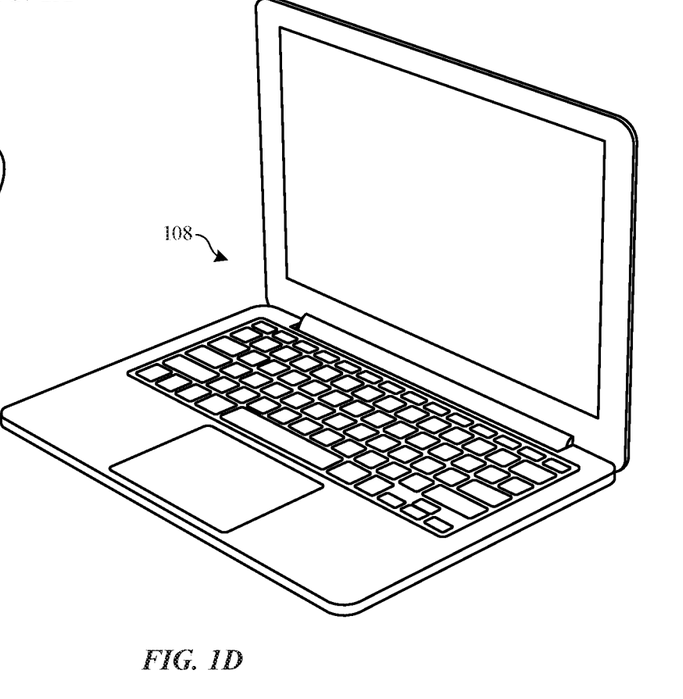

The methods described herein can be used to form durable and cosmetically appealing metallic surfaces for various products in a number of different applications, including consumer electronic products, general metal parts, magnets, marine industry parts, automotive industry parts, aerospace industry parts, and the like. FIGS. 1A-1D show consumer electronic products that can be manufactured using methods described herein. Each of the products shown in FIGS. 1A-1D include housings that are made of metal or have metal sections. FIG. 1A illustrates a portable phone 102. FIG. 1B illustrates a tablet computer 104. FIG. 1C illustrates a smart watch 106. FIG. 1D illustrates a portable computer 108. In some embodiments, the housing includes a base material or substrate, such as a metal substrate (e.g., aluminum or aluminum alloy substrate), with an aluminum zirconium alloy formed thereon. In some embodiments, the housing does not include a separate substrate, but rather, are composed primarily of aluminum zirconium alloy. That is, entire thicknesses of the housing, or entire sections of the housing, can be composed of aluminum zirconium alloy.

While many conventional aluminum alloys can have high strength and corrosion resistance, these alloys can produce discolored and cosmetically unappealing surface finishes once anodized, making them ill-suited for many types of consumer electronic products. This discoloration can be due, in part, to the presence of certain alloying elements, such as copper and zinc, when in relatively high concentrations. That is, these alloying elements, which can provide a desired high strength to the aluminum alloy, can be associated with an undesired appearance when anodized. Accordingly, it is difficult to create a strong aluminum alloy having a high scratch and dent resistance while also having an aesthetically pleasing color and appearance, using conventional techniques. Described herein are material processing techniques for providing an aluminum zirconium alloy that provides improved dent and scratch resistance, as well as aesthetic qualities suitable for a consumer electronic device, such as the housing of devices 102, 104, 106 and 108.

Figure 2A:
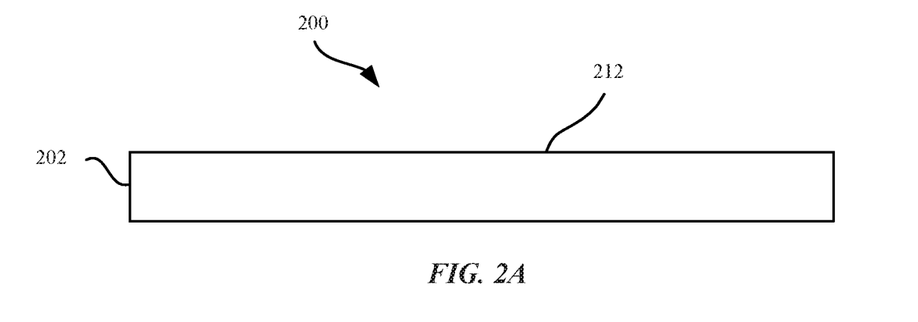
FIGS. 2A-2C illustrate cross sectional views of a metal substrate undergoing a series of steps for forming an aluminum zirconium alloy according to some embodiments.
Figure 2B:
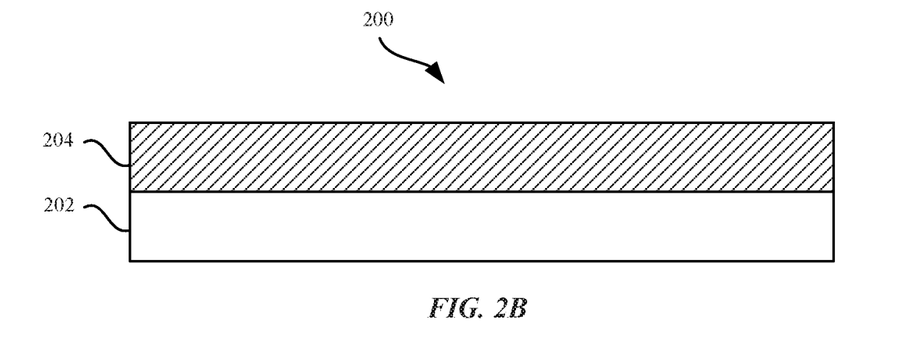
Figure 2C:
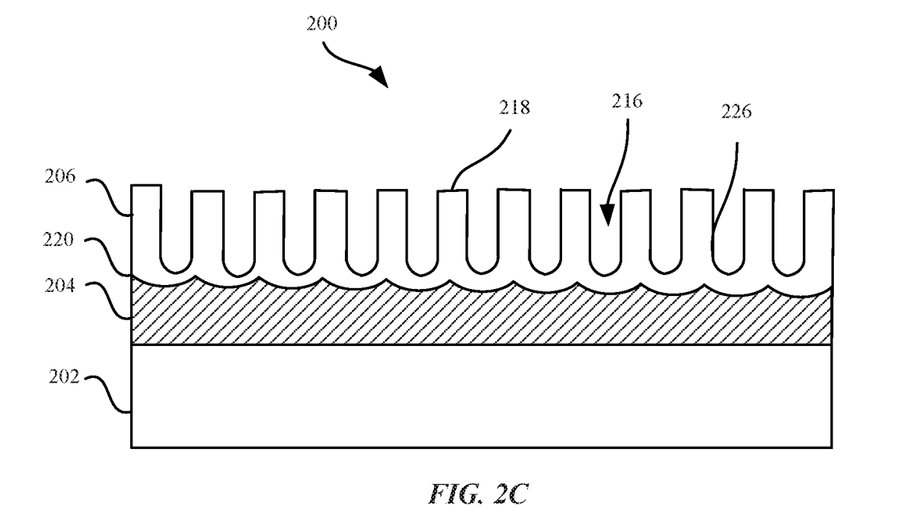

FIGS. 2A-2C illustrate a cross section of a part 200 undergoing a sequence of processing steps for providing an aluminum zirconium alloy, in accordance with some embodiments. The described part 200 can be implemented for use in a number of different applications including metal parts, articles, consumer electronic products, portable devices, general consumer devices, professional devices, magnets, aerospace industry parts, automotive industry parts, marine industry parts, and the like. FIG. 2A illustrates a metal substrate 202 prior to an electrodeposition or electroplating process. The metal substrate 202 can be made of any suitable type of metal. In some embodiments, the metal can include copper, copper alloy, aluminum, aluminum alloy, stainless steel, carbon steel, magnesium, or magnesium alloys. In some embodiments where metal substrate 202 is an aluminum alloy, the aluminum alloy can include 1000, 2000, 6000 or 7000 series aluminum alloys. For example, the metal substrate 202 can be made from 6063 series aluminum alloy.

Metal substrate 202 can have any suitable thickness suitable for a subsequent electroplating process, whereby a coating is plated or deposited onto an upper surface 212 of the metal substrate layer. In some embodiments, metal substrate 202 has a near net shape of a final part. For example, metal substrate 202 can have a general shape of a housing, such as one of the housing of devices 102, 104, 106 and 108.

In some embodiments, the metal substrate 202 can be subjected to a surface treatment prior to the electroplating process. In some embodiments, the surface treatment can be a process that eliminates or minimizes any passivation oxide layer that may be present. In some examples, where the metal substrate 202 is aluminum or an aluminum alloy, exposure to air and/or water can lead to formation of a thin and persistent natural oxide layer. The presence of the oxide layer on the metal substrate can be detrimental to providing a good adhesion to a subsequently electro-plated metal layer because the metal oxide layer can include microscopic fissures which can lead to both premature corrosion of the layer as well as cause the metal oxide layer to become susceptible to chemical dissolution. Furthermore, the presence of the oxide layer can lead to delamination of the subsequently electro-plated metal layer from the metal substrate. In some embodiments, techniques for providing a surface treatment to the metal substrate 202 can include cleaning (e.g., degreasing) the upper surface 212 of the metal substrate 202 prior to the electroplating process. In some embodiments, the metal substrate 202 may also undergo one or more texturing processes, such as one or more of a polishing, etching or blasting processes. Details as to some suitable surface treatment processes will be described in detail below with reference to FIG. 5.

FIG. 2B illustrates an aluminum zirconium alloy layer 204 that is deposited onto the metal substrate 202. The thickness of the aluminum zirconium alloy layer 204 can vary, depending on design choice and manufacturing limitations. In some embodiments, the aluminum zirconium alloy layer 204 has a thickness ranging from between about 1 micrometer to about 50 micrometers. In some embodiments, aluminum zirconium alloy layer 204 is deposited using an electrodeposition or electroplating process. In some embodiments, the aluminum zirconium alloy layer 204 can include primarily aluminum with lesser amounts of zirconium. In this way, the zirconium can be referred to as an alloying element. Details as to the various techniques and systems for electroplating the aluminum zirconium alloy layer 204 will be discussed in detail below with reference to FIG. 3.

In some embodiments, the aluminum zirconium alloy layer 204 is a coating that provides structural properties, such as hardness, rigidity, and increased resistance to deformation and scratches to the metal substrate 202. Moreover, the combination of zirconium and aluminum provides the metal substrate 202 with an increased hardness and resistance to torsional stress as provided by the addition of the zirconium In particular embodiments, aluminum zirconium alloy layer 204 is characterized as having nanocrystalline structures that increase the strength of the aluminum zirconium alloy layer 204 compared to an aluminum zirconium alloy layer 204 without such nanocrystalline structures. For example, while it can be possible to form an aluminum zirconium alloy layer 204 having mainly amorphous structures (i.e., lack of nanocrystalline structures), such aluminum zirconium alloy layer 204 has significantly reduced strength relative to an aluminum zirconium alloy layer 204 with nanocrystalline structures. The term "nanocrystalline" structures can refer to crystalline grain structures having an average size of less than 1 micrometer. In some embodiments, the nanocrystalline structures have an average size of less than 1 micrometer. The atomic percentage of zirconium available in the aluminum zirconium alloy layer 204 can be associated with the amount of nanocrystalline structures. In addition, the plating process for plating aluminum zirconium alloy layer 204 can also be used to control the quantity of nanocrystalline structures within aluminum zirconium alloy layer 204.

It should be noted, however, that embodiments presented herein are not limited to aluminum zirconium alloy layer 204 having nanocrystalline structures. For example, in some embodiments, the aluminum zirconium alloy layer 204 includes a combination (or "dual phase") of nanocrystalline and amorphous structures. As used herein, the term "amorphous" refers to a non-crystalline structure having no symmetry in the atomic positions. In some embodiments, the aluminum zirconium alloy layer 204 only includes amorphous structures (i.e., without substantial presence of nanocrystalline grains).

FIG. 2C illustrates the part 200 after a portion of aluminum zirconium alloy layer 204 is converted to an aluminum oxide layer 206. It should be noted that in some embodiments, substantially all of the aluminum zirconium alloy layer 204 is converted or consumed by the conversion to an aluminum oxide layer 206. The aluminum oxide layer 206 can be characterized as having anodic pore structures 216 (or voids) that grow in a perpendicular direction with respect to a top surface 218 of the aluminum oxide layer 206. Additionally, the anodic pore structures can be characterized as being highly ordered (i.e., parallel and evenly spaced relative to each other). The anodic pore structures 216 can be characterized as having side or walls 226. The anodic pore structures 216 can be formed through consumption of oxygen present at or near the upper surface 212. Indeed, unique physical properties of the aluminum oxide layer 206 can be attributed to the zirconium ions present in the aluminum zirconium alloy layer 204, which can impart the aluminum oxide layer 206 with decreased ductility and increased hardness. In contrast, the remaining aluminum zirconium alloy layer 204 that is not converted to the aluminum oxide layer 206 via the anodizing process is characterized as being non-porous. In some embodiments, the term "non-porous" can refer to the aluminum zirconium alloy layer 204 not being permeable to fluids, such as liquids or gases. In some embodiments, a barrier layer or a transition layer 220 is a thin layer that separates the aluminum zirconium alloy layer 204 from the aluminum oxide layer 206. The barrier layer 220 can also be characterized as being non-porous.

In some embodiments, an anodizing process is used to form the aluminum oxide layer 206 from the aluminum zirconium alloy layer 204. Any suitable anodizing process can be used. In some embodiments, a type II (sulfuric acid bath based) anodizing process is used. In some embodiments, the composition of aluminum zirconium alloy layer 204 is chosen such that an amount of discoloration of aluminum oxide layer 206 is minimized. For example, in some embodiments, aluminum zirconium alloy layer 204 can have little or no alloying elements other than zirconium. As described above, higher levels of certain elements (e.g., copper) can be associated with a yellowing of a resultant oxide layer. Thus, in some cases aluminum zirconium alloy layer 204 is substantially free of copper. In some embodiments, aluminum zirconium alloy layer 204 is substantially free of zinc. In some embodiments, aluminum zirconium alloy layer 204 includes other alloying elements other than zirconium but that do not result in the aluminum oxide layer 206 having substantial discoloration. In some embodiments, the resultant oxide layer can be intentionally anodized to form a yellow color as a matter of individual preference.

The aluminum oxide layer 206 can provide a hard scratch and dent resistant coating for the part 200. In some embodiments, the aluminum oxide layer 206 can be dyed to impart a desired color to a surface of the part 200. For example, a dye or metal colorant can be infused within pores of aluminum oxide layer 206. It should be noted, however, that this type of coloration is different than the discoloration described above, which is associated with certain alloying elements within aluminum zirconium alloy layer 204. In some embodiments, the aluminum oxide layer 206 is not dyed. In some embodiments, it is desirable for aluminum oxide layer 206 to have a substantially transparent or translucent quality. That is, aluminum oxide layer 206 can be at least partially transparent to visible light such that underlying aluminum zirconium alloy layer 204 can be visible through aluminum oxide layer 206.

In some embodiments, the aluminum oxide layer 206 can be characterized as being an electrical insulator or dielectric. In some examples, anodizing the aluminum zirconium alloy layer 204 to form the aluminum oxide layer 206 can result in an external barrier having dielectric properties, which can be beneficial for electrically shielding electrical components (e.g., processor, circuits, etc.) included within portable electronic device enclosures, such as the exemplary devices shown in FIGS. 1A-1D.

In some embodiments, the scratch and dent resistant properties of the aluminum oxide layer 206 can be directly attributed to the thickness of the aluminum oxide layer 206. In some examples, the aluminum oxide layer 206 has a thickness between about 5 micrometers to about 25 micrometers. In some embodiments, an aluminum oxide layer 206 having a thickness of 25 micrometers may have a greater hardness value (Hv) than an aluminum oxide layer 206 having an identical chemical composition, but only having a thickness of 5 micrometers.

Figure 3:
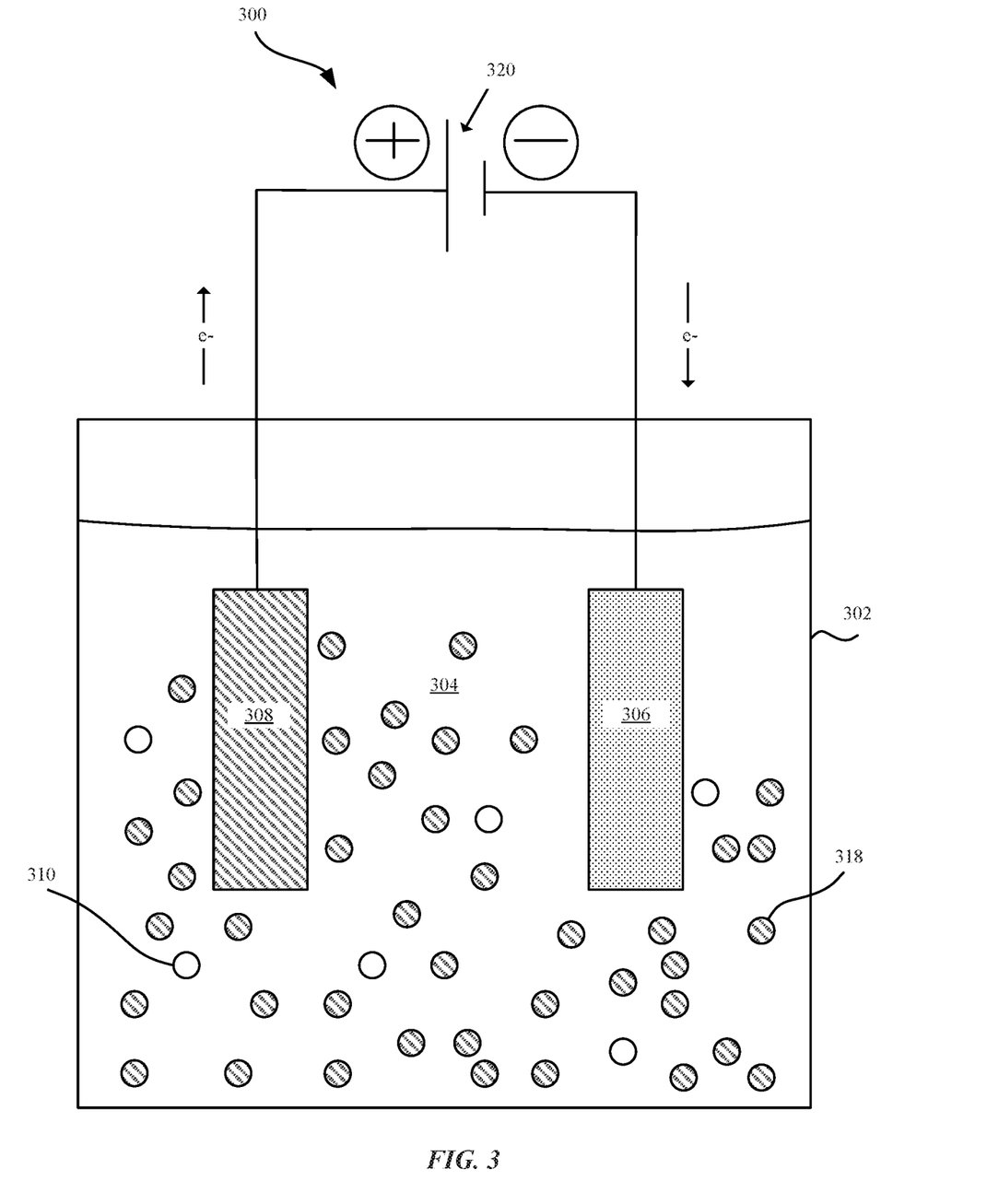
FIG. 3 illustrates an apparatus suitable for forming an aluminum zirconium alloy according to some embodiments.

FIG. 3 shows a schematic view of an apparatus 300 suitable for forming an aluminum zirconium alloy layer on a metal substrate 306, in accordance with some embodiments. Apparatus 300 includes a tank or container 302 suitable for including an electrolytic bath 304. FIG. 3 shows that the metal substrate 306 is fully immersed or submerged within the electrolytic bath 304, in accordance with some embodiments. In some embodiments, only a portion of the metal substrate 306 is immersed or submerged with the electrolytic bath 304 rendering only the submerged portion of the metal substrate 306 susceptible to forming a metal coating via an electroplating process. During electrodeposition, power supply 320 can supply an anodic electric current to anode 308 (e.g., aluminum substrate) which can oxidize the anode 308 and cause aluminum ions 318 to dissolve into the electrolytic bath 304. The potential across anode 308 and metal substrate 306 (cathode) causes aluminum ions 318 within electrolytic bath 304 to plate onto metal substrate 306. That is, power supply 320 supplies a current to anode 308 causing aluminum ions 318 within electrolytic bath 304 to flow toward and deposit as metal onto exposed surfaces of metal substrate 306. In addition, zirconium metal is added to electrolytic bath 304 such that zirconium ions 310 are formed in electrolytic bath 304, which are also attracted to and plated onto metal substrate 306 along with aluminum ions 318 (i.e., co-deposited). The resultant aluminum zirconium alloy layer plated on the metal substrate 306 will be a mixture of aluminum and zirconium, with a composition dependent on the concentration of zirconium ions 310 within electrolytic bath 304.

In some embodiments, electrolytic bath 304 corresponds to a non-aqueous ionic liquid. Unlike aqueous solutions, non-aqueous ionic liquids are capable of electroplating metals such as aluminum onto a metal substrate because metallic ions are reduced at the cathode instead of the hydrogen ions. Thus, an electrolytic bath 304 that is a non-aqueous ionic liquid can provide an oxide-free environment such that aluminum ions 318, along with zirconium ions 310, can plate onto metal substrate 306. In some embodiments, the non-aqueous ionic liquid can include one or more co-solvents and/or additives that may influence electric conductivity, viscosity, surface tension of the electrolytic bath 304, and/or diffusion of aluminum ions 318 and/or zirconium ions 310 within electrolytic bath 304.

The presence of water in the plating bath can impart the production of hydrogen. During an electroplating process, hydrogen can cause non-uniform electroplated metal coatings, which can cause the electroplated metal to be brittle and include cracks. In contrast, non-aqueous ionic liquids can produce a negligible amount of hydrogen, and thus can facilitate in forming a continuous and uniform electroplated coating, i.e., without significant cracks or voids.

In some embodiments, the ionic liquid is a mixture of aluminum chloride ($AlCl_3$) and 1-ethyl-3-methylimidazolium chloride (EMIM-Cl), which is capable of transferring an electric current from the aluminum substrate at the anode to the metal substrate at the cathode. In some embodiments, the ratio of $AlCl_3$ relative to EMIM-Cl is between about 1.1:1 to about 2:1. In some embodiments, 1-Ethyl-3-methylimidazolium tetrafluoroborate and 1-Ethyl-3-methylimidazolium trifluoromethylsulfonate can also be used as ionic liquids in the plating bath. Process conditions for the electroplating process can vary. In some embodiments, the temperature of the plating bath can be less than 100° Celsius as ionic liquids are generally in a liquid state at room temperature. In some embodiments, the ionic liquids can be operated in a plating bath having a temperature between about −20° Celsius to about 250° Celsius. In some embodiments, the plating bath can have an operating range between about 20° Celsius to about 100° Celsius. In some embodiments, the concentration of dissolved zirconium ions in the ionic liquid can be between about 0.1 g/kg to about 5 g/kg. In some embodiments, the concentration of dissolved zirconium ions in the ionic liquid can be between about 1 g/kg to about 3 g/kg. In some embodiments, the concentration of dissolved zirconium ions in the ionic liquid can be between about 1 g/kg to about 2 g/kg.

In some embodiments, the composition of electrolytic bath 304 is chosen so as to optimize co-deposition of the zirconium ions 310 and the aluminum ions 318. For example, zirconium metal can be reduced by electroplating when in a $^{4+}$ valence state ($Zr^{4+}$ ions). Thus, in some embodiments, the composition of electrolytic bath 304 is chosen to maximize $Zr^{4+}$ ions. In some embodiments, the $Zr^{4+}$ ions can be prepared by providing zirconium chloride ($ZrCl_4$) into the electrolytic bath 304. Zirconium ions can also be introduced by applying an anodic current to the zirconium metal, in accordance with some embodiments.

As described above, the resulting aluminum zirconium alloy can include crystalline structures having a grain size of less than one micrometer, which can enhance the strength of the aluminum zirconium alloy. Furthermore, tailoring the crystalline grain size within the aluminum zirconium alloy can reduce the occurrence of macroscopic defects, such as cracks, in the aluminum zirconium alloy. The size and quantity of nanocrystalline structures can be controlled, in part, by adjusting relative amounts of zirconium ions 310 dissolved in the electrolytic bath 304. In some embodiments, a high concentration of zirconium ions 310 is associated with smaller nanocrystalline grain sizes. In some embodiments, an even higher concentration of zirconium ions 310 can lead to formation of amorphous crystal structures throughout the aluminum zirconium alloy. However, the formation of amorphous crystal structures formed throughout the aluminum zirconium alloy can compromise or reduce the strength of the aluminum zirconium alloy. In contrast, in some embodiments, nanocrystalline structures having a grain size of less than 1 micrometer were found to provide optimal strength to the aluminum zirconium alloy.

In some embodiments, the power supply 320 can be electrically coupled to a rectifier (not shown). The rectifier is a device that converts alternating current (AC) to direct current (DC) so that the electric current flows in only a single direction. By using a rectifier, a cathodic electric current can be directed in a single direction towards the cathode 306, thereby causing aluminum ions 318 and zirconium ions 310 to plate onto metal substrate 306. In some embodiments, the rectifier is configured to switch the direction of the electric current such that an anodic electric current is directed towards the metal substrate 306, which can cause some of the plated aluminum and zirconium on metal substrate 306 to dissolve as ions back into electrolytic bath 304. Changing the direction of the electric current towards the metal substrate 306 can also facilitate removing contaminants that could be plated onto the metal substrate 306. In some embodiments, the anodic electric current density can be of similar magnitude to the cathodic electric current density. Reversing the electric pulse again such that the cathodic electric current is directed towards the cathode 306 can cause aluminum ions 318 and zirconium ions 310 to redeposit onto the metal substrate 306. Thus, by alternating between an anodic electric current and a cathodic electric current, aluminum and zirconium can plate onto metal substrate 306 while reducing the plating of contaminants. In addition, this reverse pulse plating can cause leveling the surface of the metal substrate 306 to provide a more uniform or continuous electroplated layer. In particular, a reverse electric pulsed current can eliminate localized buildup of plated materials even when there is a high concentration of certain ions in the plating bath. In addition, reverse pulse plating can facilitate the growth of finer crystalline structures on the electroplated layer; thus further promoting formation of nanocrystalline structures, which as described above improve mechanical strength of the aluminum zirconium alloy. In addition, nanocrystalline structures in the aluminum zirconium alloy layer can have a high level of electrical conductivity. The high level of electrical conductivity can be beneficial in the manufacture and use of portable electronic device enclosures, such as for establishing a grounding path from the metallic enclosure to a grounding electrode. In contrast, aluminum zirconium alloy layer without nanocrystalline structures can have a low amount of electrical conductivity.

The final thickness of the aluminum zirconium alloy layer can vary depending on a desired thickness and on process parameters. In some embodiments, the aluminum zirconium alloy layer has a final thickness between about 10 micrometers and about 800 micrometers.

Figure 4:
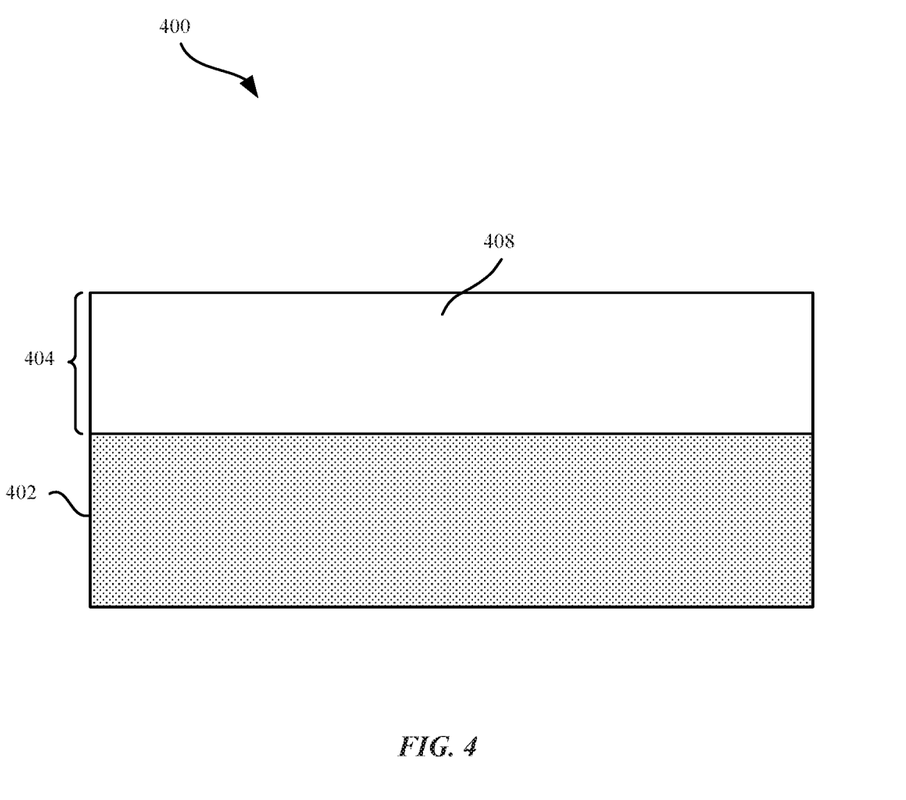
FIG. 4 illustrates a cross sectional view of an aluminum zirconium alloy according to some embodiments.

As described above, nanocrystalline structures within the aluminum zirconium alloy can increase the hardness and scratch resistance of the aluminum zirconium alloy layer. FIG. 4 illustrates a cross section view of part 400 that includes aluminum zirconium alloy layer 404 with nanocrystalline grain structures 408. Aluminum zirconium alloy layer 404 can be plated onto the metal substrate 402 using the techniques described above. In some embodiments, nanocrystalline grain structures 408 refer to grains which can be uniformly distributed throughout the aluminum zirconium alloy layer 404. In other words, the nanocrystalline grain structures 408 are uniformly or homogenously distributed throughout the deposit. In some embodiments, the aluminum zirconium alloy layer 404 can be entirely comprised of the nanocrystalline grain structures 408, and does not include amorphous structures. In some embodiments, nanocrystalline grain structures 408 can have a grain size of less than about 100 nanometers. In some embodiments, the nanocrystalline grain structures have a grain size of less than 1 micrometer.

The nanocrystalline grain structures 408 can constitute a combination of both aluminum and zirconium that impart to the part 400 an increased hardness and resistance to scratches, abrasions, and damage. A finer grain size of nanocrystalline grain structures 408 can be associated with a harder and more scratch resistant aluminum zirconium alloy layer 404. In some embodiments, the presence of zirconium at grain boundaries can prevent grain growth and/or recrystallization. Hence, the presence of zirconium can enable a more stable, nano-grain size. In some embodiments, the term "recrystallization" can refer to new, larger grains that are formed at the expense of smaller grains. In some examples, larger grain can grow at the expense of smaller grain through the motion of grain boundaries. Recrystallization of aluminum is generally accompanied by a reduction in strength and hardness and an increase in ductility (ability of a metal to deform under torsional stress) of pure aluminum. The addition of zirconium can form nanocrystalline grain structures, thereby providing increased hardness compared to pure aluminum. In addition, nanocrystalline grain structures 408 can also prevent cracks or voids from forming within aluminum zirconium alloy layer 404.

The percentage of zirconium within aluminum zirconium alloy layer 404 can vary; however, certain percentages of zirconium can be associated with reduced grain size of nanocrystalline grain structures 408. In some embodiments, aluminum zirconium alloy layer 404 includes an atomic percentage of zirconium between about 1 percent to about 12 percent. In other examples, the atomic percentage between 7 percent to about 10 percent.

In some embodiments, the aluminum zirconium alloy layer can include amorphous or non-crystalline structures. In some examples, there can be a transition region in the aluminum zirconium alloy layer where nanocrystalline structures are embedded in an amorphous matrix In some embodiments, as the atomic percentage of zirconium increases, the grain size of the nanocrystalline structures can be reduced until the grain size is but a few nanometers (e.g., about 3 nanometers to about 5 nanometers). In such instance, the grain size transitions to an amorphous state (i.e., non-crystalline structure). For example, an atomic percentage of zirconium in excess of 12 percent can trend towards increased favoring of forming amorphous structures over nanocrystalline structures. Generally, a combination of dual phase nanocrystalline and amorphous structures will impart the alloy layer with a decreased hardness and scratch resistance relative to an alloy layer including only nanocrystal line grain structures. In other examples, the alloy layer can include a combination of both nanocrystalline structures and amorphous structures.

The thickness of the aluminum zirconium alloy layer 404 can be suitable to provide a sufficient barrier to protect the underlying metal substrate from damage. In addition, if anodized, the thickness of aluminum zirconium alloy layer 404 should be thick enough to provide a sufficiently thick protective aluminum oxide layer. For example, for an aluminum oxide layer having a target thickness of about 20 micrometers, aluminum zirconium alloy layer 404 should have a thickness of at least 20 micrometers. It should be noted, however, in some embodiments, the entire thickness or substantially all of the aluminum zirconium alloy layer 404 can be intentionally converted to a corresponding aluminum oxide layer, and optionally even a portion of metal substrate 402 is also converted to metal oxide (e.g., if metal substrate 402 is aluminum or aluminum alloy). In some embodiments, only a partial portion of the aluminum zirconium alloy layer 404 can be intentionally converted to the corresponding aluminum oxide layer. For example, a small portion of the aluminum zirconium alloy layer 404 can be converted to an aluminum oxide layer. In some embodiments, the aluminum zirconium alloy layer 404 can have a thickness between about 10 micrometers and about 800 micrometers. In some embodiments, the aluminum zirconium alloy layer 404 has a thickness between about 100 micrometers to 300 micrometers. In some examples, the resulting aluminum oxide layer can incorporate at least one of amorphous sulfate ions or zirconium ions. Furthermore, the percentage of zirconium ions in the aluminum oxide layer can be substantially similar to the percentage of zirconium ions present in the aluminum zirconium alloy layer 404.

Figure 5:
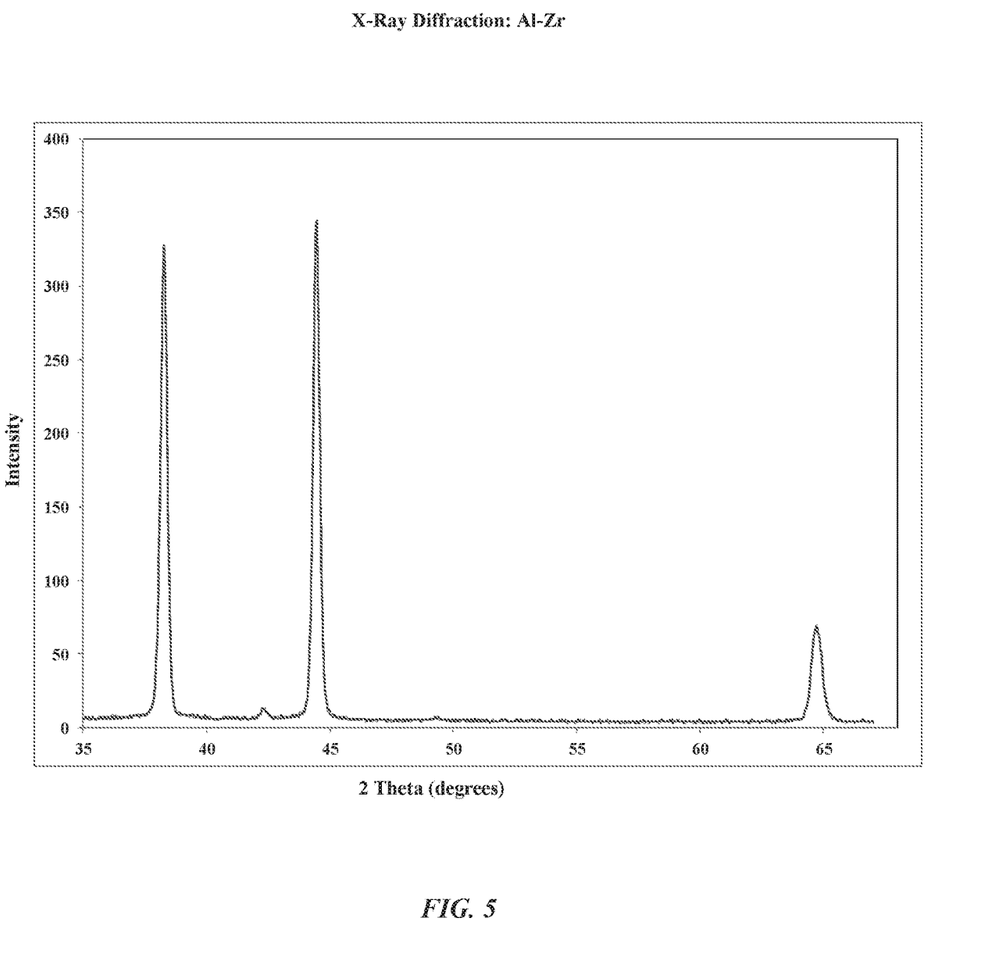
FIG. 5 is an X-ray diffraction graph of an aluminum zirconium alloy according to some embodiments.

FIG. 5 is an X-ray diffraction graph that illustrates a distribution of zirconium ions within the aluminum zirconium alloy layer (see e.g., ref. 404). In conventional techniques, the amount of zirconium ions that can be soluble within a solid aluminum structure is significantly limited. For example, in conventional techniques, the upper limit of solubility of zirconium ions in an aluminum structure is about 0.01 atomic percent at room temperature (e.g., ~21° Celsius). In contrast, FIG. 5 shows a sample having an aluminum zirconium alloy layer (see e.g., ref. 404) that includes about 6 atomic percent of zirconium that was prepared using a brass metal substrate, according to some embodiments. The X-ray diffraction graph shows three major peaks at about 38, 44, and 64 degrees two theta. Each major peak identifies the material as the face-centered cubic structure (fcc) structure of aluminum. Accordingly, the X-ray diffraction graph provides support for the conclusion that the aluminum zirconium alloy layer (see e.g., ref. 404) can be characterized as a solid solution of aluminum matrix that includes dissolved zirconium ions. In some examples, the aluminum zirconium alloy layer can include up to about 12 atomic percent of dissolved zirconium without compromising the solid solution of the aluminum matrix. FIG. 5 further shows a small peak near 43 degrees two theta. This small peak can refer to an experimental artifact due to the brass metal substrate.

Figure 6:
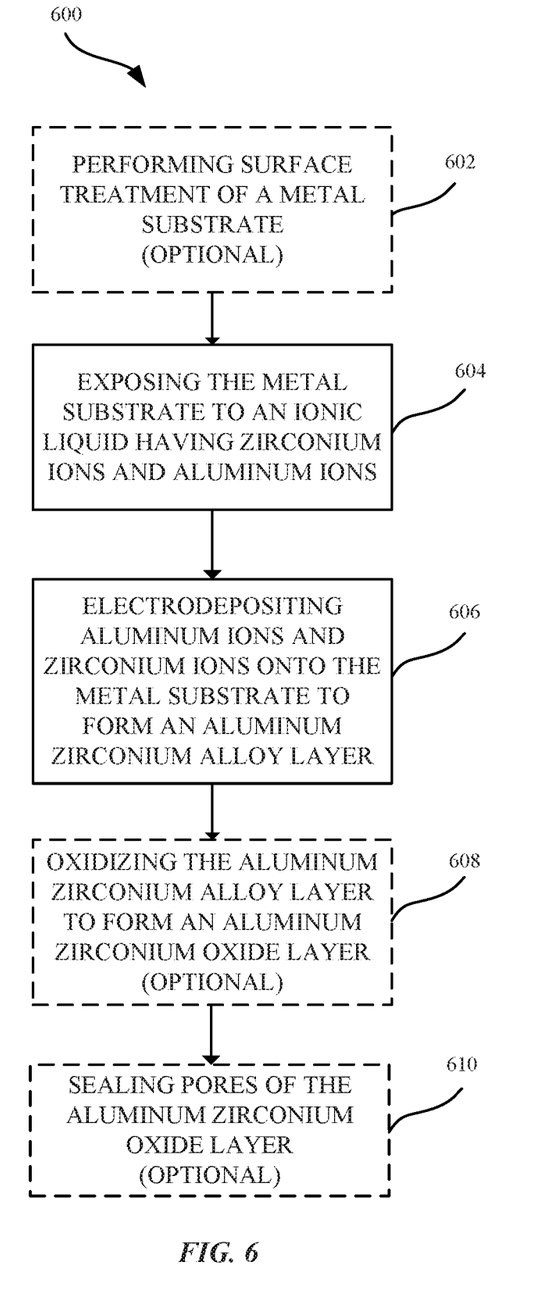
FIG. 6 illustrates a flowchart indicating a process for forming an aluminum zirconium alloy according to some embodiments.

FIG. 6 illustrates a process 600 for forming an aluminum zirconium alloy, in accordance with some embodiments. As shown in FIG. 6, the process 600 can begin at step 602, where a surface of a metal substrate is optionally treated. The surface treatment can be a process that eliminates or minimizes any oxide layer that may be present on the surface of the metal substrate. In some examples, where the metal substrate is aluminum or an aluminum alloy, exposure to air and/or water can lead to forming a thin and persistent natural oxide layer. In some embodiments, the metal oxide layer can be removed via the surface treatment in order to reveal the metal substrate. As a result, the subsequently electrodeposited aluminum zirconium layer can be directly bonded to the metal substrate. In some embodiments, techniques for providing a surface treatment to the metal substrate layer can include cleaning (e.g., degreasing) the outer surface of the metal substrate layer prior to the electroplating process. In some embodiments, the metal substrate layer may also undergo one or more texturizing processes, such as one or more of a polishing, etching or blasting process. Details as to techniques and methods that may be suitable for removing a metal oxide layer and performing a treatment on the surface of the metal substrate are described in U.S. Patent Application Publication No. 2015/0322582, hereby incorporated by reference in its entirety for all purposes.

At step 604, the metal substrate is exposed to an ionic liquid having aluminum ions and zirconium ions. In some embodiments, the ionic liquid is a non-aqueous ionic liquid. In some embodiments, the ionic liquid includes a mixture of aluminum chloride ($AlCl_3$) and 1-Ethyl-3-methylimidazolium chloride (EMIM-Cl). Zirconium can be electrochemically dissolved in the ionic liquid to form zirconium ions have a charge of +4. The ionic liquid can act as both a solvent suitable for providing zirconium in a +4 valence state and as an electrically conductive fluid for the electrolytic process. In some embodiments, the zirconium ions are not dissolved in the ionic liquid until an electric current is applied to the metal substrate.

At step 606, aluminum and zirconium are co-deposited onto the metal substrate to form the aluminum zirconium alloy layer. In some embodiments, a electrodeposition process involves applying an anodic electric current to an aluminum anode such that the aluminum is oxidized at the anode to $Al^{+3}$. The resulting aluminum ions $Al^{+3}$ are dissolved into the ionic liquid. The $Al^{+3}$ ions pass through the ionic liquid solution such that aluminum ions are transferred from the anode to the metal substrate at the cathode. At the cathode, the aluminum ions Al are reduced by gaining three electrons at the metal substrate. The result is the effective transfer of aluminum from the anode source to the cathode source. In some embodiments, zirconium ions are supplied within the ionic liquid by the addition of zirconium chloride ($ZrCl_4$). Additionally, in some examples, the zirconium ions can be supplied within the ionic liquid by applying an anodic electric current to a zirconium metal. In some embodiments, the aluminum zirconium alloy layer includes nanocrystalline structures. In some embodiments, a combination of nanocrystalline structures and amorphous structures are formed in the aluminum zirconium alloy layer.

In some embodiments, a rectifier is used to convert alternating current (AC) to direct current (DC) so that the electric current flows in only a single direction. The rectifier can also be configured to switch the direction of the anodic and cathodic current flow, which can facilitate in removing contaminants that could otherwise be deposited on the metal substrates. Applying a reverse pulse electric current to the plating bath can be also used to dissolve metal ions from the metal substrate and re-deposit the dissolved metal ions onto the metal substrate to form a more uniform or continuous aluminum zirconium alloy layer. Applying the reverse pulse electric current can favor the formation of nanocrystalline structures within the aluminum zirconium alloy layer. Moreover, applying the reverse pulse electric current can promote more uniform distribution of nanocrystalline structures within the aluminum zirconium alloy layer. Additionally, applying the reverse pulse electric current can also remove any roughness in the formed nanocrystalline structures.

At step 608, the aluminum zirconium alloy is optionally oxidized to form an aluminum oxide layer. Any suitable oxidizing process can be used, such as a suitable anodizing process. In general, anodizing refers to an electrolytic passivation process that converts a portion of a layer of the aluminum zirconium alloy layer to a corresponding aluminum oxide layer. An exemplary apparatus for anodizing the aluminum zirconium alloy can include a power supply that is electrically coupled to a cathode and anode. The aluminum zirconium alloy layer serves as the anode and is immersed within an electrolytic solution. A direct current from the power supply passes to the anode and through the electrolytic solution to the cathode before returning to the power supply to complete the circuit. The oxidation process results in the release of hydrogen at the cathode and oxygen at the aluminum zirconium alloy to form an oxide layer. In some embodiments, substantially all of the aluminum zirconium alloy layer is converted to an aluminum oxide layer. In some embodiments, only a partial portion of the aluminum zirconium alloy layer can be consumed or converted to an aluminum oxide layer. In some embodiments, a portion of the underlying metal substrate is also converted to a metal oxide (e.g., aluminum oxide).

In general, the visual quality of an aluminum oxide layer can depend, in part, on the type(s) and amount(s) of alloying elements within the aluminum alloy. For example, copper within an aluminum alloy can cause the resultant aluminum oxide layer to have a yellow hue, with the amount of yellowing directly associated with an amount of copper within the aluminum alloy. The aluminum zirconium alloys described herein can be anodized to form aluminum oxides having little discoloration, which can be desirable in certain applications. In addition, the nanocrystalline grain structures can impart hardness to the aluminum zirconium alloys sufficient for use in many applications without the use of other alloying elements that can cause severe discoloration.

At step 610, pores of the aluminum oxide layer can be sealed in a subsequent operation. Sealing the pores of the aluminum oxide layer can impart corrosion resistance as well as prevent further oxidation of the aluminum alloy layer.

Figure 7:
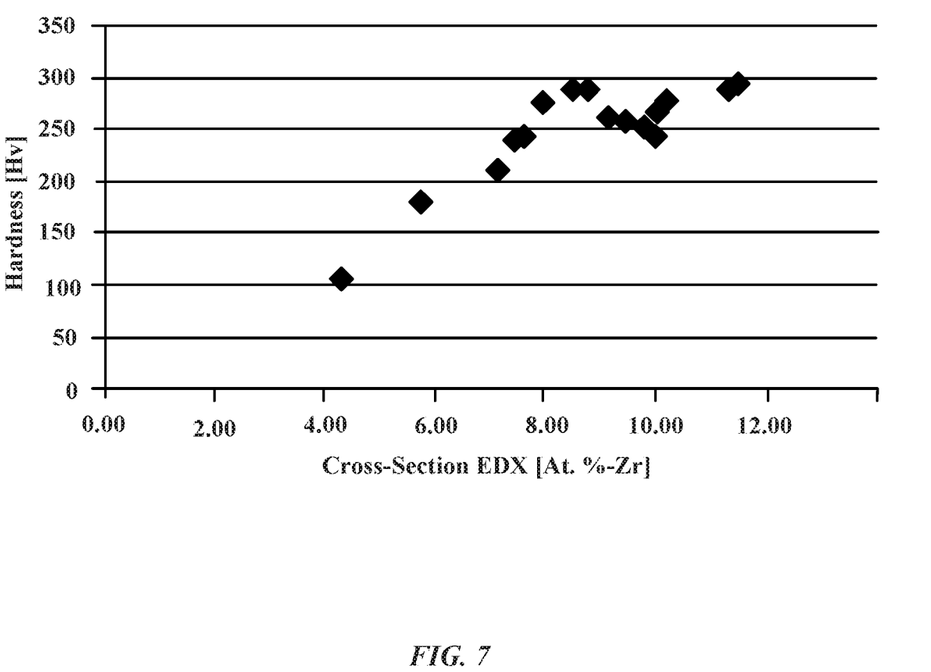
FIG. 7 illustrates a graph showing a relationship between the hardness of various aluminum zirconium alloy samples and the atomic percentage of zirconium.

FIG. 7 shows a graph indicating a relationship between the hardness of an aluminum zirconium alloy and the atomic percentage of zirconium for a number of substrate samples. The hardness of the aluminum zirconium alloy is represented in units of Vickers Pyramid Number (HV). In general, the Vickers hardness test can be used to determine a material's ability to resist deformation when a stress load is applied across a surface area unit of the sample. As shown in FIG. 7, all of the aluminum zirconium alloy samples exhibit a hardness number greater than 100 HV. The hardness of the aluminum zirconium alloy can be correlated to the percentage of zirconium present. For example, 6% zirconium is associated with a hardness value of close to 200 HV. The graph of FIG. 7 also indicates that zirconium content between about 8% to about 12% can result in a relatively constant hardness value of between about 200 HV to about 300 HV.

In addition, the formation of nanocrystalline structures in the aluminum zirconium alloy layer can be correlated to the atomic percentage of zirconium that is present. In some embodiments, when zirconium has an atomic percentage between about 1 percent to about 12 percent, the nanocrystalline deposits can have relatively fine grain sizes. As shown in FIG. 7, when zirconium is present between about 7 atomic percent to about 12 atomic percent of the alloy layer yields a nanocrystalline alloy layer having a Vickers Hardness number of about 300 HV. Thus, an atomic percent of 7 percent to about 12 percent of zirconium indicates where there is formation of fine grain sizes of nanocrystal structures having a grain size as low as 6 nanometers. Accordingly, the presence of nanocrystal line grain structures impart the alloy layer with increased levels of hardness relative to alloy layer without nanocrystalline grain structures (e.g., generally amorphous structures).

At a threshold atomic percentage, an atomic percentage of zirconium can favor forming amorphous structures over nanocrystalline structures. In some examples, when the atomic percentage of zirconium exceeds about 20 percent, the aluminum zirconium layer can have solely amorphous structures. In some examples, when the atomic percentage of zirconium exceeds 12 percent, the aluminum zirconium layer can have solely amorphous structures. In addition, larger grain size deposits, which can be attributed to amorphous structure formation, may impart a non-uniform or non-continuous alloy layer due to cracks or voids present in the alloy layer.

Figure 8:
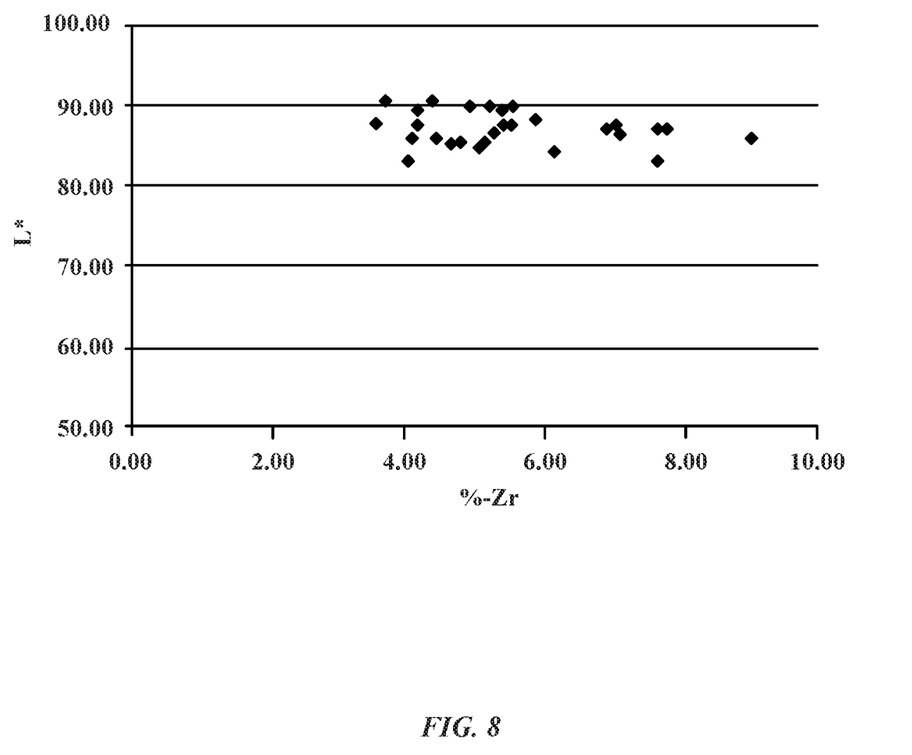
FIG. 8 illustrates a graph showing a relationship between L* color dimension value of various aluminum zirconium alloy samples and atomic percentage of zirconium.

FIG. 8 shows a graph indicating the relationship between lightness (L*) of an anodized aluminum zirconium alloy layer and the atomic percentage of zirconium in the anodized aluminum zirconium alloy layer according to various sample metal substrate samples. FIG. 8 shows L * color-opponent dimension values for multiple aluminum zirconium alloy samples having an anodic oxide layer. The L* color opponent dimension value is one variable in an L *a*b* color space. In general, L * corresponds to an amount of lightness. The lightness, L*, represents the darkest black at L*=0, and white at L*=100. With regard to many anodic oxidized metal alloys, some alloying elements can have a deleterious effect on the color and appearance by creating a discolored or dull finish. In contrast, FIG. 8 shows that aluminum zirconium alloys exhibit little to no loss in lightness after anodizing. Generally, the anodized aluminum zirconium alloys exhibited L*≥75. Accordingly, the anodized aluminum zirconium alloy layer is able to retain a generally pleasing aesthetic finish and appearance, which can be used to provide cosmetically appealing exterior portions of metal enclosures and casings for electronic devices. In some embodiments, the surface finish and color of the oxidized aluminum zirconium alloy layer can substantially resemble a non-oxidized aluminum zirconium alloy layer.

Figure 9:
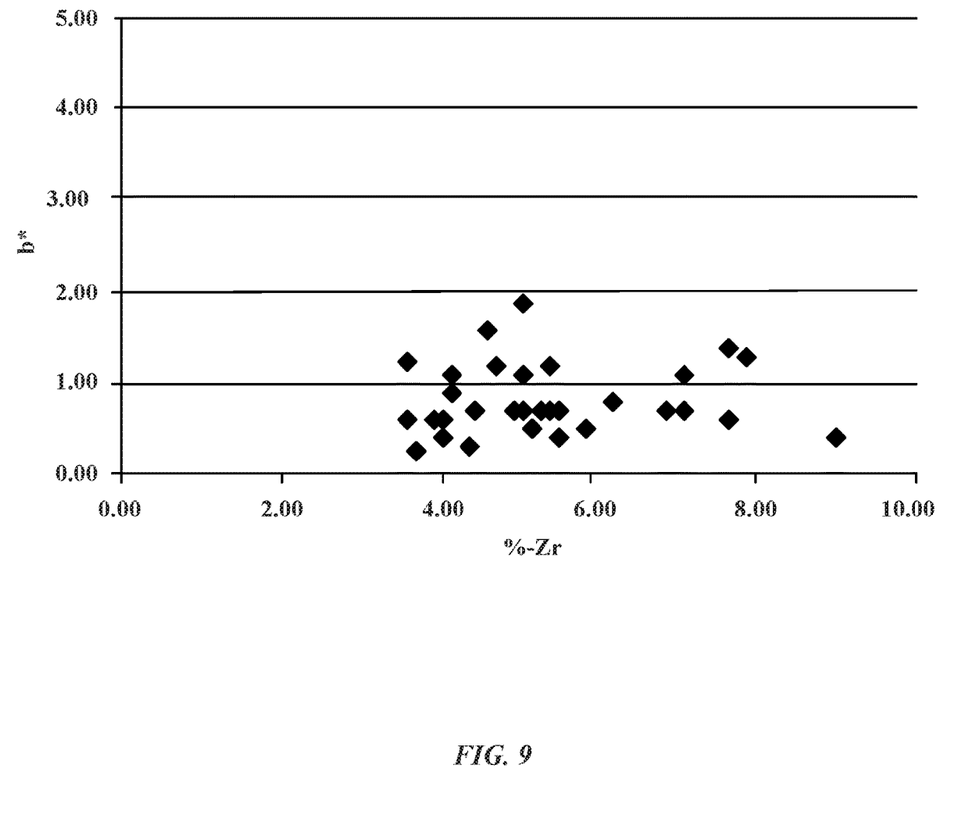
FIG. 9 illustrates a graph showing a relationship between the b* color dimension value of various aluminum zirconium alloy samples and atomic percentage of zirconium.

FIG. 8 shows different samples of metal substrates having an aluminum zirconium oxide layer with substantially strong stability in lightness as a function of the atomic percentage of zirconium. FIG. 8 shows that even with zirconium atomic percentage ranging between about 4% to about 9% that the L* dimension value remains relatively constant between about 80 to about 90. Accordingly, oxidizing the aluminum zirconium alloy layer can show little to no effect in muting the lightness of the alloy layer. This advantage in using zirconium ions can be beneficial for forming cosmetically appealing exterior portions of metal enclosures and casings for electronic devices FIG. 9 shows a graph indicating the relationship between the b* color dimension value of an aluminum zirconium alloy and the atomic percentage of zirconium in the anodic oxide layer for multiple aluminum zirconium alloy samples with an anodic oxide layer. In general, b* indicates amounts of blue color and yellow color in a sample. A negative b* value indicates a blue color, while a positive b* value indicates yellow color. Accordingly, samples having a positive b* value will indicate more yellow than blue is present.

As shown in FIG. 9, various samples having an anodic aluminum zirconium oxide layer were tested for a b* dimension color value. Samples having between about 3% to about 9% zirconium were tested. Prior to being anodized, the electroplated aluminum zirconium alloy layer exhibited a neutral b* value (e.g., b*=0). In some embodiments, the aluminum zirconium oxide layer has a b* value between about 0.7 to about 5. Referring to FIG. 9, one sample of the aluminum zirconium alloy layer has an atomic percent of 4% of zirconium and a b* value of about 1.0. Another sample has an atomic percent of 9% of zirconium and a b* value of about 0.5. Across several samples, the max b* value anodic aluminum zirconium oxide layer is between about 3 to 4. Accordingly, the step of anodizing the aluminum zirconium alloy layer produced little to no effect on the color of the alloy layer. Thus, the anodized aluminum zirconium alloy layer is able to retain a generally pleasing aesthetic and appearance which can facilitate in providing protective and cosmetically appealing exterior portions of metal enclosures and casings for electronic devices. It should be noted that increasing the atomic percent of zirconium within the aluminum zirconium alloy layer can cause the resulting anodic aluminum zirconium oxide layer to have a non-transparent appearance (e.g., yellow color), which can significantly affect the manner in which the aluminum zirconium alloy layer is visible from the top surface of the aluminum oxide layer.

In some examples, these samples showed formation of nanocrystalline grain structures and a general absence of amorphous structures. Thus, it is shown that the aforementioned techniques described herein can produce aluminum zirconium alloys and oxide layers thereof having relatively neutral b* values, while having significantly improved hardness values relative to other types of aluminum alloys due to the presence of nanocrystalline structures and/or a uniformly deposited aluminum zirconium alloy layer.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A consumer electronic product, comprising:
an enclosure comprising:
an aluminum alloy layer having (i) nanocrystalline structures that have a grain size of less than 1 micrometer, and (ii) alloying element ions that include between 1 atomic percent to 12 atomic percent of zirconium.

2. The consumer electronic product of claim 1, wherein the alloying element ions inhibit recrystallization of grain structures having a grain size greater than 100 nanometers.

3. The consumer electronic product of claim 1, further comprising an aluminum oxide layer overlaying and formed from the aluminum alloy layer.

4. The consumer electronic product of claim 1, wherein the aluminum alloy layer has a Vickers hardness value of greater than 100 HV.

5. The consumer electronic product of claim 3, wherein the aluminum oxide layer has a thickness between 5 micrometers to 25 micrometers.

6. The consumer electronic product of claim 3, wherein the aluminum oxide layer has an L* value of greater than 80.

7. A consumer electronic product, comprising:
an enclosure comprising:
a metal substrate, and
an aluminum alloy layer bonded to the metal substrate, wherein the aluminum alloy layer includes (i) nanocrystalline structures having a grain size of less than 100 nanometers, and (ii) alloying element ions having between 1 atomic percent to 12 atomic percent of zirconium so as to inhibit recrystallization of grain structures having a size greater than 100 nanometers.

8. The consumer electronic product of claim 7, wherein the aluminum alloy layer is free of voids.

9. The consumer electronic product of claim 7, further comprising an aluminum oxide coating that is formed from and overlays the aluminum alloy layer.

10. An article of manufacture, comprising:
an aluminum alloy layer having alloying element ions that inhibit recrystallization of grain structures having a size greater than 100 nanometers, wherein the alloying element ions include between 1 atomic percent to 12 atomic percent of zirconium.

11. An article of manufacture, comprising:
a metal substrate; and
an aluminum alloy layer overlaying the metal substrate, wherein the aluminum alloy layer includes (i) nanocrystalline structures having a grain size of less than 100 nanometers, and (ii) alloying element ions that include between 1 atomic percent to 12 atomic percent of zirconium.

12. A method of forming a consumer electronic product enclosure including a metal substrate, the method comprising:
forming an aluminum zirconium alloy layer by co-depositing aluminum ions and zirconium ions onto the metal substrate, wherein the aluminum zirconium alloy layer includes between 1 atomic percent to 12 atomic percent of the zirconium ions.

13. The method of claim 12, further comprising:
oxidizing at least a portion of the aluminum zirconium alloy to form an aluminum oxide layer.

14. The method of claim 12, wherein the aluminum ions and zirconium ions are co-deposited in a plating bath that includes a non-aqueous ionic liquid.

15. The method of claim 12, wherein co-depositing the aluminum ions and the zirconium ions comprises applying a pulsed electric current.

16. The method of claim 15, wherein applying the pulsed electric current is associated with forming a nanocrystalline structure within the aluminum zirconium alloy.

17. The method of claim 15, wherein applying the pulsed electric current comprises:
applying a cathodic pulse current to the metal substrate such as to deposit the zirconium ions onto the metal substrate; and
applying an anodic pulse current to the metal substrate such as to re-dissolve a portion of the aluminum zirconium alloy layer.

18. The method of claim 12, wherein co-depositing the aluminum zirconium alloy layer onto the metal substrate is free of hydrogen production.

19. The method of claim 12, wherein the aluminum zirconium alloy layer has a Vickers hardness value of greater than 100 HV.

20. The method of claim 13, wherein the aluminum oxide layer has an L* value of greater than about 80.

* * * * *